(12) United States Patent
Liu et al.

(10) Patent No.: US 12,223,691 B2
(45) Date of Patent: Feb. 11, 2025

(54) MAX-FLOW/MIN-CUT SOLUTION ALGORITHM FOR EARLY TERMINATING PUSH-RELABEL ALGORITHM

(71) Applicant: SHANGHAITECH UNIVERSITY, Shanghai (CN)

(72) Inventors: Xinzhe Liu, Shanghai (CN); Guangyao Yan, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/798,898

(22) PCT Filed: Sep. 22, 2021

(86) PCT No.: PCT/CN2021/119508
§ 371 (c)(1),
(2) Date: Aug. 11, 2022

(87) PCT Pub. No.: WO2022/222367
PCT Pub. Date: Oct. 27, 2022

(65) Prior Publication Data
US 2024/0112443 A1    Apr. 4, 2024

(30) Foreign Application Priority Data
Apr. 20, 2021   (CN) .......................... 202110421777.5

(51) Int. Cl.
*G06V 10/762*   (2022.01)
*G06V 10/764*   (2022.01)
*G06V 10/96*    (2022.01)

(52) U.S. Cl.
CPC ........ *G06V 10/7635* (2022.01); *G06V 10/764* (2022.01); *G06V 10/96* (2022.01)

(58) Field of Classification Search
CPC .. G06V 10/7635; G06V 10/764; G06V 10/96; G06V 10/267; G06V 10/26; G06T 7/11; G06T 7/162
See application file for complete search history.

(56) References Cited

U.S. PATENT DOCUMENTS

2005/0235236 A1   10/2005   Sharma et al.
2007/0286483 A1 * 12/2007   Delong .................... G06T 7/12
                                                     382/173

FOREIGN PATENT DOCUMENTS

CN    101783028 A    7/2010
CN    103198470 A    7/2013
(Continued)

OTHER PUBLICATIONS

G. Yan, X. Liu, F. Chen, H. Wang and Y. Ha, "Ultra-Fast FPGA Implementation of Graph Cut Algorithm With Ripple Push and Early Termination," in IEEE Transactions on Circuits and Systems I: Regular Papers, vol. 69, No. 4, pp. 1532-1545, Apr. 2022, doi: 10.1109/TCSI.2021.3137590. (Year: 2022).*

(Continued)

*Primary Examiner* — Vu Le
*Assistant Examiner* — Valenteana Shlommit Fung
(74) *Attorney, Agent, or Firm* — Bayramoglu Law Offices LLC

(57) ABSTRACT

A max-flow/min-cut solution algorithm for early terminating a push-relabel algorithm is provided. The max-flow/min-cut solution algorithm is used for an application that does not require an exact maximum flow, and includes: defining an early termination condition of the push-relabel algorithm by a separation condition and a stable condition; determining that the separation condition is satisfied if there is no source node s, s∈S, in the set T at any time in an operation process of the push-relabel algorithm; determining that the stable condition is satisfied if there is no active node in the set T;

(Continued)

and terminating the push-relabel algorithm if both the separation condition and the stability condition are satisfied. The early termination technique is proposed to greatly reduce redundant computations and ensure that the algorithm terminates correctly in all cases.

2 Claims, 2 Drawing Sheets

(56) References Cited

FOREIGN PATENT DOCUMENTS

| | | | | |
|---|---|---|---|---|
| CN | 104239126 B | * | 3/2018 | .............. G06F 9/46 |
| CN | 113139976 A | | 7/2021 | |

OTHER PUBLICATIONS

Y. Boykov and V. Kolmogorov, "An experimental comparison of min-cut/max- flow algorithms for energy minimization in vision," in IEEE Transactions on Pattern Analysis and Machine Intelligence, vol. 26, No. 9, pp. 1124-1137, Sep. 2004, doi: 10.1109/TPAMI .2004.60. (Year: 2004).*

Zhao Li-Feng, et al., Improvement of an Algorithm Solving Maximum Flow Based on a Network Diagram, Computer Technology and Development, 2010, pp. 162-165, 176, vol. 20, No. 12.

She Xiang-Yang, et al., New algorithm for maximum flow algorithm in network with both node and edge capacity confined, Computer Applications, 2008, pp. 143-145, vol. 28, No. 1.

* cited by examiner

MAX-FLOW/MIN-CUT SOLUTION ALGORITHM FOR EARLY TERMINATING PUSH-RELABEL ALGORITHM

CROSS REFERENCE TO THE RELATED APPLICATIONS

This application is the national phase entry of International Application No. PCT/CN2021/119508, filed on Sep. 22, 2021, which is based upon and claims priority to Chinese Patent Application No. 202110421777.5, filed on Apr. 20, 2021, the entire contents of which are incorporated herein by reference.

TECHNICAL FIELD

The present invention relates to a max-flow/min-cut solution algorithm for early terminating a push-relabel algorithm.

BACKGROUND

The graph cut algorithm is widely used to solve the minimum cut problem ubiquitous in computer vision tasks. These tasks map image pixels onto the nodes of a graph, and then assign the most probable label to each node of the graph. All of the nodes in the graph are cut into two disjoint sets, namely set S and set T. The cut is supposed to minimize the cost function for the specific application scenario. The minimum cut problem can often be transformed into a maximum flow problem that is more intuitive and easier to solve. These tasks appear widely in image/video segmentation, image/video stitching, binocular vision matching, classification, image fusion, image dehazing, skeletonization and style transfer, etc.

Graph cuts can yield impressive quality of results, but are relatively slow in practical applications. The existing implementations of graph cuts usually cannot make full use of the characteristics of application scenarios to reduce redundant computations. For example, in many applications where the maximum flow problem occurs, only the maximum flow value, or the minimum cut rather than the complete maximum flow with all detail is required.

There have been attempts to optimize the computation of the push-relabel algorithm. Global relabel updates height labels with global information, reducing redundant relabeling operations in the set T. In contrast, gap relabel reduces redundant push-relabel operations in the set S by updating the distribution of height labels. In addition, JF-cut proposes an early termination technique to remove redundant computations. It terminates the push-relabel algorithm unless it finds an augmenting path. However, the early termination condition thereof is excessively aggressive because it does not ensure that the algorithm terminates correctly in all cases.

SUMMARY

The technical problem to be solved by the present invention is that the existing rush-relabel algorithm usually cannot make full use of the characteristics of application scenarios to reduce redundant computations, and is thus not suitable for application scenarios with high resolution and real-time requirements.

In order to solve the above technical problem, a technical solution of the present invention is to provide a max-flow/min-cut solution algorithm for early terminating a push-relabel algorithm. The max-flow/min-cut solution algorithm is used for an application that does not require an exact maximum flow, and includes: defining an early termination condition of the push-relabel algorithm by a separation condition and a stable condition; assuming that all nodes v reachable to a sink node t in a residual graph constitute a set T and other nodes constitute a set S; determining that the separation condition is satisfied if there is no source node s, s∈S, in the set T at any time in an operation process of the push-relabel algorithm; determining that the stable condition is satisfied if there is no active node in the set T; and terminating the push-relabel algorithm if both the separation condition and the stability condition are satisfied, where the separation condition is defined as the absence of an augmenting path from a source node to the sink node in the residual graph; and the stable condition is defined as the absence of an augmenting path from any active node to the sink node in the residual graph.

Another technical solution of the present invention is to provide a use of the max-flow/min-cut solution algorithm for early terminating a push-relabel algorithm for an application that requires only a maximum flow value, or a minimum cut rather than a complete maximum flow with all detail.

In the present invention, the separation condition ensures that the set V formed by all nodes v is divided into two disjoint sets S and set T, that is, a (s,t)—cut is generated. In the present invention, the stable condition guarantees that the generated (s,t)—cut does not change until the algorithm satisfies the original termination condition.

The present invention proposes an early termination technique that greatly reduces redundant computations and ensures that the algorithm terminates correctly in all cases. Experimental results show that the termination condition of the present invention can reduce the computations of the test data to an average of 2%.

DETAILED DESCRIPTION OF THE EMBODIMENTS

Figure 1:
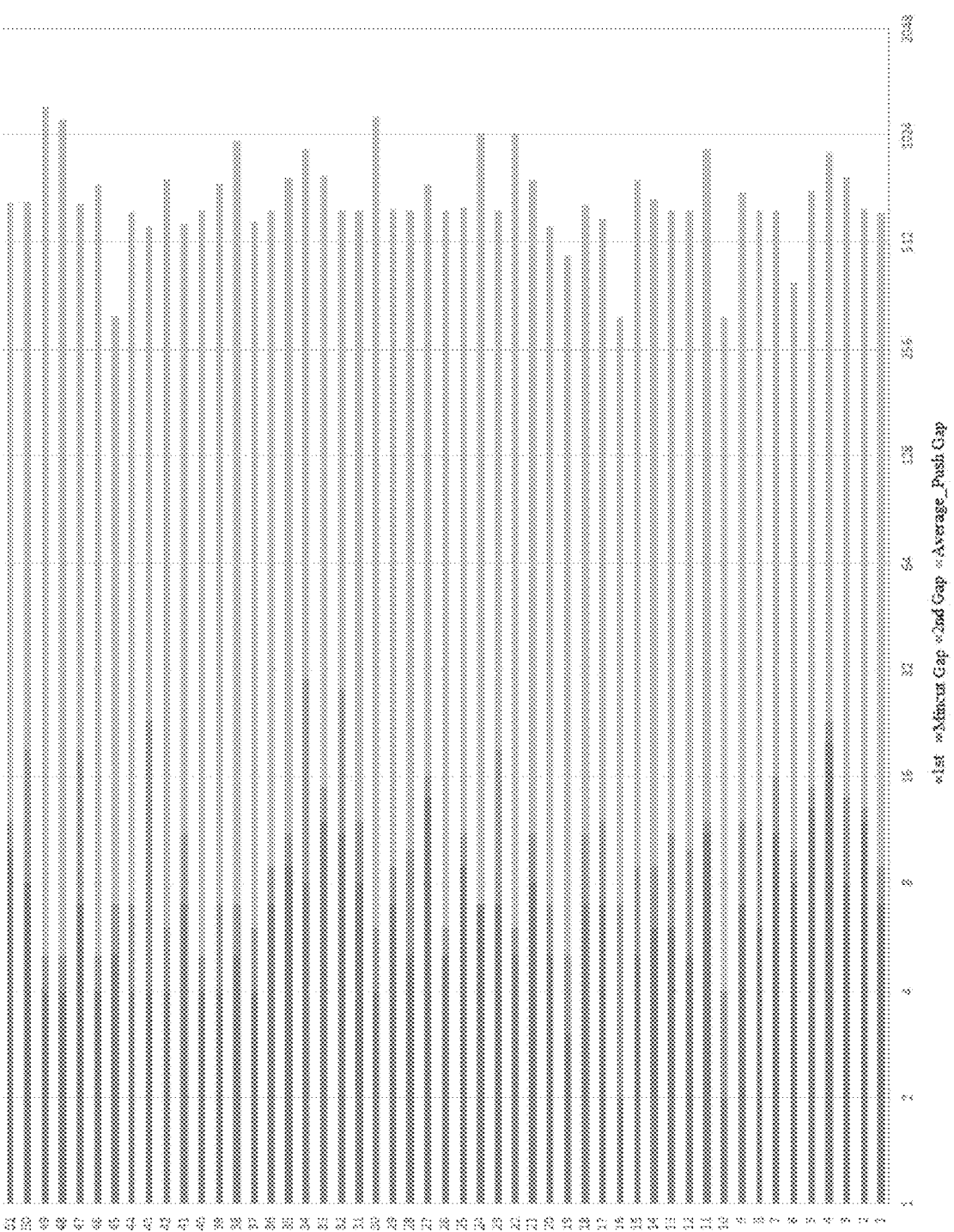
FIG. 1 shows results of multiple test cases.

The present invention will be described in detail below with reference to specific embodiments. It should be understood that these embodiments are only intended to describe the present invention, rather than to limit the scope of the present invention. In addition, it should be understood that various changes and modifications may be made on the present invention by those skilled in the art after reading the content of the present invention, and these equivalent forms also fall within the scope defined by the appended claims of the present invention.

An original termination condition of a push-relabel algorithm is to check whether there is no active node in a residual graph, which creates redundant computations in an application that requires only a maximum flow value, or a minimum cut rather than a complete maximum flow with all detail. In the application, a set S and a set T are separated for a long time late in the algorithm and will not change until the end, and this period is called a "finishing phase". During the "finishing phase", the push-relabel algorithm is busy pushing an excess flow in the set T to a sink node t, and relabeling the height of an active node in the set S to allow the excess flow to flow back to a source node s. For an application that does not require an exact maximum flow, the "finishing phase" of the push-relabel algorithm is redundant.

In view of this, the present invention proposes an early termination condition of the push-relabel algorithm defined by a separation condition and a stable condition. The separation condition is defined as the absence of an augmenting path from a source node to the sink node in the residual graph, and the stable condition is defined as the absence of an augmenting path from any active node to the sink node in the residual graph.

Based on the early termination condition, the push-relabel algorithm includes the following content:

For a graph G(V,E), V denotes a set of vertices, and E denotes a set of edges. A source node is defined as s∈ V, and a sink node is defined as t∈ V. A capacity function of the edge is defined as c:E→R, where R denotes a set of real numbers. A flow network is defined as F=(G,c,s,t).

A pseudo-flow is defined as $f_p$:E→R, and $f_p$ satisfies the following two constraints:
(1) Skew symmetry: f(u,v)=−f(v,u), where (u,v) denotes a directed edge from u to v, and (v,u) denotes a directed edge from v to u.
(2) Capacity constraint: f(u,v)≤c(u,v).

An excess flow of nodes is defined as ef:V→R. For u, ef(u)=$\Sigma_{v \in V}$f(v,u).

For u, if ef(u)>0, u is an active node.

A pre-flow is defined as f:E→R. The pre-flow is a pseudo-flow, and for all non-source nodes, the excess flow is not negative: ∀v∈ V/{s}, ef(v)≥0.

A residual graph of the graph G with respect to the pre-flow f is defined as $G_f$(V,$E_f$), and $E_f$ denotes an edge set of the residual graph.

An excess capacity is defined as $c_f$:E→R. For an edge e, the excess capacity is $c_f$(e)=c(e)−f(e)

A height label function of nodes is defined as h:V→N, where N denotes a set of integers. If ∀(u,v)∈ $E_f$, h(u)≤h(v)+1, then the height label is "legal".

A feasible edge is defined. An edge (u,v) is feasible if h(u)≤h(v)+1.

A path is defined as P(u,v). The path is an ordered sequence of nodes {u, $w_0$, $w_1$, . . . , $w_k$, v}. For any neighboring nodes in the sequence, for example, $w_i$ and $w_{i+1}$, ($w_i$, $w_{i+1}$)∈ E.

Reachable is defined. If there is a path P(u,v), u is reachable to v.

A number of nodes in P(u,v) with the least number of nodes minus one yield a distance from u to v, which is denoted as d(u,v). d(u,v) is initialized to 0.

A set T is composed of all nodes reachable to a sink node t.

Therefore, the max-flow/min-cut solution algorithm for early terminating push-relabel algorithm includes the following steps:

An initialization operation is performed.

The pre-flow is initialized, f(e)←0, ∀e∈ E, and the height label is initialized, h(v)←d(v,t).

Alternatively, the height of the source node s is initialized to |V|, and the labels of other nodes are initialized to 0. At this point, a push operation should be performed immediately for all edges from the source node without checking whether they are feasible edges.

A push operation is performed.

An active node u is found from the set T. A feasible edge (u,v) is found for the active node, and the push operation is performed in the following order:

$\delta \leftarrow \min(ef(u), c_f(u,v))$ $f(u,v) \leftarrow f(u,v) + \delta$ $f(v,u) \leftarrow f(v,u) - \delta$ $ef(u) \leftarrow ef(u) - \delta$ $ef(v) \leftarrow ef(v) + \delta$ A relabel operation is performed.

An active node u is found from the set. If there is no feasible edge found for the active node, the relabel operation is performed as follows:

$$h(u) \leftarrow 1 + \min_{c_f(u,v)>0} h(v)$$

A T tree update operation is performed.

Starting from the sink node t, all nodes reachable to t are searched to update the set T.

Any push operations, relabel operations and T tree update operations may be performed in random order.

A termination determination is made at any time of the above calculation process, and it is determined whether the separation condition and the stable condition are satisfied at the same time. If yes, the algorithm terminates, otherwise, it returns to the push operation. If there is no source node s in the set T, the separation condition is satisfied; if there is no active node in the set T, the stable condition is satisfied.

In FIG. 1, each bar denotes a test case, and the abscissa denotes the number of iteration cycles. In the iteration cycle denoted by the leftmost part, there is no (s,t)—cut. In the iteration cycle denoted by the second part from the left, there is already a (s,t)—cut, but it is not yet a minimum cut. In the iteration cycle denoted by the third part from the left, there is already a minimum cut, but the algorithm will still run because there are still active nodes in T, i.e., the stable condition is not satisfied. In the iteration cycle denoted by the first part from the right, there are no more active nodes in T, but the algorithm with the original termination condition will continue to run because there are still active nodes in S. The algorithm of the present invention will stop at the right end of the third part from the left, while the original algorithm will stop at the right end of the first part from the right. It can be seen that the algorithm of the present invention can save a lot of computations.

Figure 2:
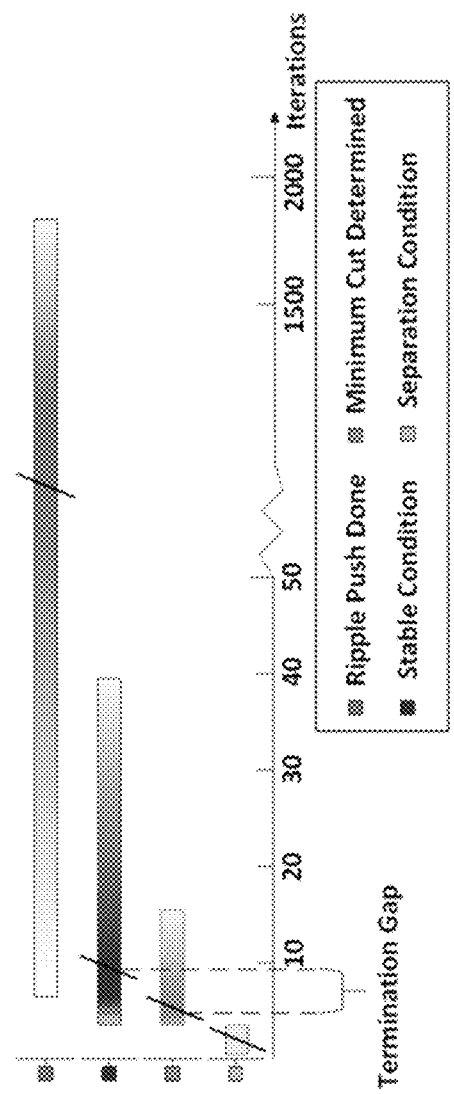
FIG. 2 shows statistical results acquired from more test data.

FIG. 2 shows statistical results acquired from more test data. The second bar from top indicates that the minimum cut is determined. This is not exactly the same as the third bar from the bottom, which indicates that the stable condition is met. An iterative gap between the averages of these two bars is called a termination gap. The left and right edges of the bar graph are respectively the minimum and maximum values of the number of iterations that satisfy the corresponding conditions. The left slash in the middle indicates the average. It can be seen from the figure that the time to determine the minimum cut is close to the time to satisfy the stable condition, and it is far from the original termination of the push-relabel algorithm (the first from the bottom up).

The present invention is applicable to all max-flow/min-cut problems that can use the push-relabel algorithm, and can run on a central processing unit (CPU), a graphics processing unit (GPU) or a field programmable gate array (FPGA). This embodiment provides an FPGA implementation example.

To evaluate the method proposed by the present invention, the present invention uses the widely used Middlebury benchmark to test the push-relabel algorithm. A baseline image is segmented into 25×25 tiles. The tile size is also the size of a processor array. The processor array can process 625 nodes in a two-dimensional (2D) grid graph in parallel. The present invention uses SystemVerilog to describe the hardware implementation of the entire system. The present invention uses Xilinx's Virtex Ultrascale VU190 as an evaluation board and Xilinx Vivado 2020.1 as an electronic design automation (EDA) tool. The clock frequency of the VU190 evaluation board is set to 66 MHz. Compared to the state-of-the-art method, the early termination function of the present invention can achieve at least a 12-fold speedup.

What is claimed is:

1. A computer vision method, implemented by a processor, employing a max-flow/min-cut solution algorithm for early terminating a push-relabel algorithm, used for an application that does not require an exact maximum flow, comprising:

defining, by the processor, an early termination condition of the push-relabel algorithm by a separation condition and a stable condition;

mapping, by the processor, image pixels onto a plurality of nodes;

assuming, by the processor, that all nodes v of the plurality of nodes reachable to a sink node t of the plurality of nodes in a residual graph constitute a set T and other nodes of the plurality of nodes constitute a set S;

determining, by the processor, that the separation condition is satisfied when there is no source node s, s∈S, in the set T at any time in an operation process of the push-relabel algorithm;

determining, by the processor, that the stable condition is satisfied when there is no active node in the set T; and terminating, by the processor, the push-relabel algorithm when the separation condition and the stability condition are satisfied to reduce computations implemented by the processor to perform the computer vision method on the image pixels;

wherein the separation condition is defined as an absence of an augmenting path from a source node to the sink node in the residual graph; and the stable condition is defined as an absence of an augmenting path from any active node to the sink node in the residual graph.

2. The according to claim 1, comprising: applying the max-flow/min-cut solution algorithm in an application, wherein the application requires only a maximum flow value, or a minimum cut rather than a complete maximum flow with all detail.

* * * * *